United States Patent
Taylor

(10) Patent No.: US 6,658,589 B1
(45) Date of Patent: Dec. 2, 2003

(54) SYSTEM AND METHOD FOR BACKUP A PARALLEL SERVER DATA STORAGE SYSTEM

(75) Inventor: Kenneth J. Taylor, Franklin, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 09/467,358

(22) Filed: Dec. 20, 1999

(51) Int. Cl.[7] ............................................... G06F 11/00
(52) U.S. Cl. ........................................ 714/6; 707/202
(58) Field of Search ............................. 714/6, 9, 13, 11, 714/20, 19, 16; 707/202, 204; 711/162

(56) References Cited

U.S. PATENT DOCUMENTS

| | | | | |
|---|---|---|---|---|
| 5,495,570 A | * | 2/1996 | Heugel et al. ................. | 714/11 |
| 5,640,561 A | * | 6/1997 | Satoh et al. ................. | 707/202 |
| 5,951,695 A | * | 9/1999 | Kolovson .................... | 714/11 |
| 6,078,930 A | * | 6/2000 | Lee et al. .................... | 707/202 |
| 6,275,953 B1 | * | 8/2001 | Vahalia et al. ................ | 714/11 |
| 6,345,331 B1 | * | 2/2002 | Fuente ......................... | 710/15 |
| 6,421,787 B1 | * | 7/2002 | Slaughter et al. .............. | 714/4 |

OTHER PUBLICATIONS

*EMC Data Manager Product Description Guide*, 1999, Chapter 4, EDM Symmetrix Connect and EDM Symmetrix Path, pp. 23–31.

* cited by examiner

*Primary Examiner*—Robert Beausoliel
*Assistant Examiner*—Christopher S. McCarthy
(74) *Attorney, Agent, or Firm*—Brian L. Michaelis; Steven M. McHugh; Brown Rudnick Berlack Israels LLP

(57) ABSTRACT

A system and method for safe and effective backup and restore of parallel server databases stored in data storage systems. Parallel server databases allow multiple nodes in MPP (Massively Parallel Processor) or SMP (Symmetric Multi-Processor) systems to simultaneously access a database. Each node is running an instance (thread) which provides access to the database. The present invention allows for online or offline backup to be performed from any node in the system, with proper access to all control files and logs, both archived and online, whether the files are stored in raw partitions in the data storage system, or local on certain nodes. Two different types of external restore supported: complete external restore and partial external restore. In a complete external restore, all spaces will be restored to the most recent checkpoint that was generated while creating an external backup. If users lose only a portion of the data (which is more typically the case), a partial external restore may be performed.

18 Claims, 10 Drawing Sheets

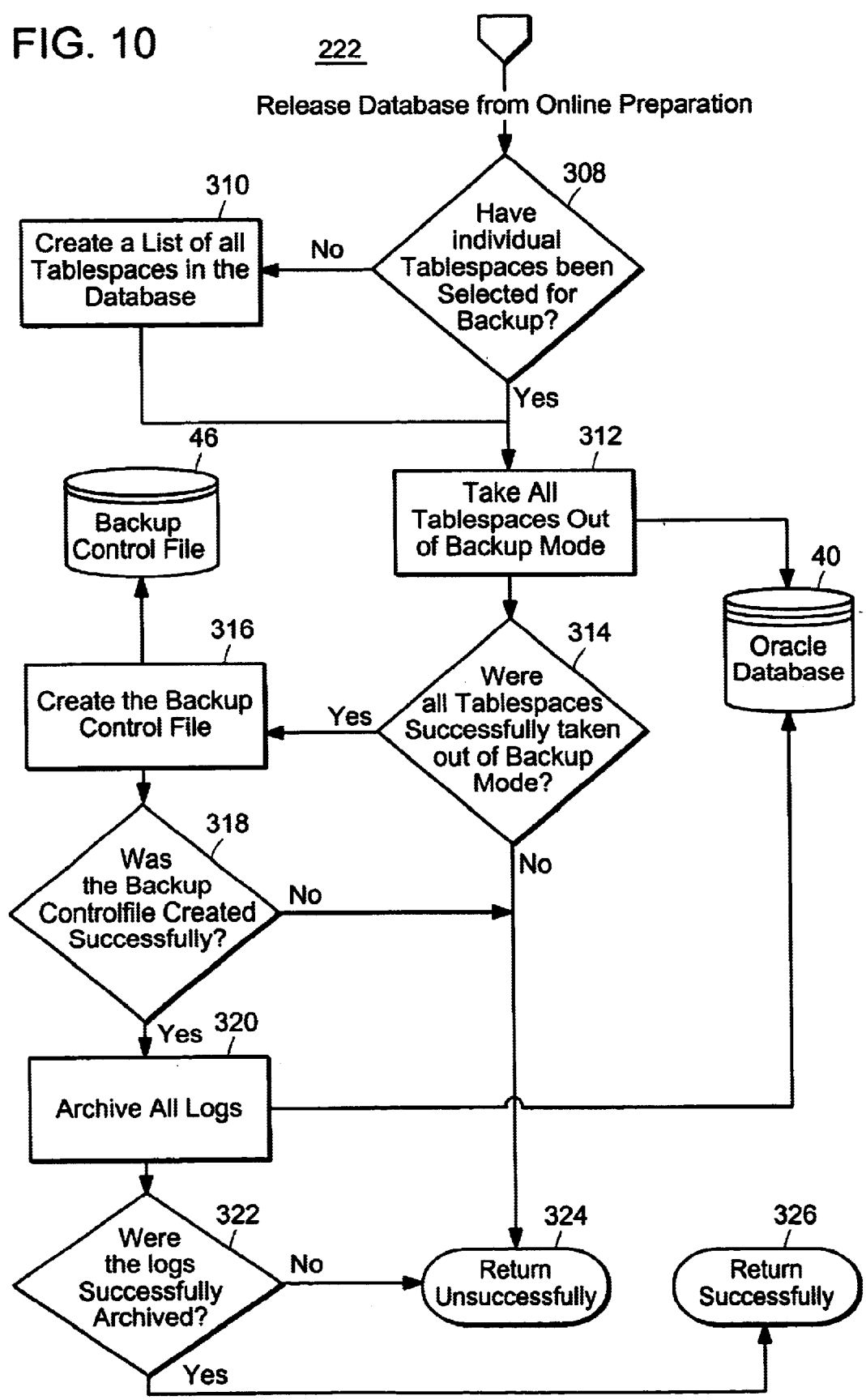

SYSTEM AND METHOD FOR BACKUP A PARALLEL SERVER DATA STORAGE SYSTEM

FIELD OF THE INVENTION

This invention is directed towards data storage systems, and more particularly towards physical backup and restore of databases serving multi-processor computers.

BACKGROUND

Computer systems allow the processing of massive quantities of data for a variety of purposes. As the ability to process data has increased, so has the need for data storage systems which provide massive data storage capabilities combined with fast access for host systems. Another feature required by many businesses and industries is continuous availability. Many businesses operate on a world-wide basis, and have a need for round-the-clock access to databases stored in one or more data storage systems. The data stored in these data storage systems is changing at an incredible rate, for example with transaction processing, reservation systems and data mining, the data is changing and updating many times per second.

Another requirement for data storage systems is periodic backup of data both for archival purposes and for data recovery in case of a system failure. For many businesses, a loss of data can be catastrophic. Therefore, system backups must be performed on a frequent basis.

However, the need for system backups often interferes with the need for continuous availability. With many data storage systems, performing a system backup requires taking the data storage system offline, thereby denying continuous access to the data.

One solution to this problem is used for RAID (Redundant Array of Independent Disks) systems. In RAID-1 systems, two physical storage devices, such as disks, each store identical data, in a process known as "mirroring". This provides a very high level of fault tolerance in the form of redundancy, and it also allows data backups to be performed while still allowing continuous data access. Typically, the mirroring process is stopped (referred to as splitting the mirrors), and one of the disks is taken off-line and backed up, while the other disk remains online and available. When the first disk is completely backed up, the two disks are resynchronized (so that the data is identical on both), and the data storage system returns to full operation.

An overview of major components of a backup data system 10 is shown in FIG. 1. One or more host computer systems 12 access, process and store data from a data storage system 14. The host systems 12, including Massively Parallel Processor (MPP) or Symmetric Multi-Processor (SMP) systems are interfaced to the data storage system 14 over an interface 16, which may be any of various types of interface such as a network or SCSI interface. The host systems 12 are also interfaced 20 to a backup system 22, which provides data backup and restore to appropriate storage devices 24, for example via tape storage. This interface 20 between the host systems 12 and the backup system 22 is also any of various types of interface, such as a TCP/IP connection.

The data storage system 14 is any of various types of mass data storage systems, including for example a RAID system with multiple disks. A RAID-1 system is illustrated with two mirrored disk volumes (mirrors) 18a, 18b. The mirrors 18a, 18b are connected 21 such that the data is replicated on both mirrors 18a, 18b. Although the mirrors 18a, 18b are illustrated in a same data storage system 14 enclosure, the mirrors can be physically remote from each other, but still support RAID-1 mirroring using a remote data facility option, including a high-speed connection 21 such as an ESCON® fibre link connection.

For backup and restore of data stored on the data storage system 14, a standard method for backup requires the host systems 12 to extract the data from the databases on the data storage system 14 and pipe the data over to the backup management system 22. This method is incredibly slow, and it requires tying up the host system's 12 time in the form of database access operations and data pipelining. A better solution is known as "direct connect". A high speed direct connection 26 is provided between the data storage system 14 and the backup management system 22, thereby allowing fast transfer of data directly to the backup management system 22, without the need for host system 12 intervention. This high speed direct connection 26 can be over any of various types of interfaces, such as a SCSI connection.

An example data storage system 14 is the Symmetrix mass storage system provided by EMC Corporation of Hopkinton, Mass. An example backup management system 22 is the EMC Data Manager (EDM). EDM can support backup and restore via three different methods, each tailored to particular backup environments and needs. The same EDM can support three different backup methods simultaneously, and enables host systems 12 and users to stay operational, with continued access to the data storage system 14 while backup occurs.

There are several types of database servers available, including parallel server databases. A parallel server database is a database server with enhancements that allow a common database to be shared among the nodes of an MPP or loosely coupled SMP system. A node can be an independent processor on an MPP or SMP machine, or a separate machine belonging to a clustered hardware environment. Parallel server databases provide processor scalability, where additional processing power may be added through the addition of more processor nodes, as well as high availability (also known as fault tolerance) in that if one processor node goes down, the other processor nodes can transparently take over the work of the down processor node.

However, there are problems related to parallel server databases. Since several nodes are accessing and writing the same database, there are problems relating to the coherency of the data. Further, backup and restore of the parallel server database becomes very complicated. Current systems are designed to handle backup and restore of a database which exists on a single database client machine, and which has only one node instance (thread) 30 FIG. 2 associated with it. A thread is one process of multiple processes running on a computer system. A thread of change log information keeps track of the database changes made by a single instance.

Typical parallel server database applications, such as an Oracle® database from Oracle Corporation of Redwood Shores, Calif., have an architecture which includes several data files to maintain database coherence and availability. Such data files include a control file 32, which is a small administrative file required by every database, necessary to start and run a database system. A control file 32 is paired with a database, not with an instance 30. Multiple identical control files (not shown) are preferred to a single file 32, for reasons of data security. Other data files include a "redo"

log, which is a sequential log of actions that are to be reapplied to the database if they did not get written to disk. The log usually consists of at least two files; one is optionally being spooled to disk (archived) 34 while the other is being written (online) 36. Online redo logs 36 are redo logs that have not been archived. The online redo logs 36 may be available to the instance 30 for recording activity, or have previously been written but are awaiting archiving. Finally, there is typically a parameter file 38 which maintains instance-specific information, for example buffer sizes, archived redo log locations, and other routine information.

In this architecture (as shown in FIG. 2), the backup system is only concerned with backup and restore of (1) data files (not shown) as seen from the database client, (2) backup copy of the control file 32 as seen from the database client, and (3) archived redo logs 34 which reside in the archived log directory as seen from the database client. The online redo logs 36, and parameter or config files 38 are not backed up. Parallel server database providers recommend that online redo logs 36 should not be used in a backup/recovery scheme. Therefore, backup systems simply backup all archive log 34 and backup control file 32 information over the network 20 FIG. 1. These objects (archive redo logs 34 and control files 32) exist as files in the file system.

A parallel server database also places several restrictions on a backup system for a data storage system. All data files in a parallel server database configuration must reside on raw partitions (contiguous portions of a storage device such as a disk) and be visible to all parallel server database nodes. All online redo logs 36 and control files 32 must also reside in raw partitions and be visible to all parallel server database nodes. Also, one database is serviced by several instances 30, which means the backup system cannot simply equate the specific instance 30 with the database name. Finally, when doing a proper offline backup, the database must not be opened by any instance.

SUMMARY

The present invention provides for safe and effective backup and restore of parallel server databases stored in data storage systems. Online or offline backup can be performed from any node in the system, with proper access to all control files and logs, both archived and online.

The present invention includes a backup system applicable to a parallel database in a clustered shared disk environment or MPP (massively parallel processor) environment where each instance has access to the exact same shared disk. This differs from other parallel database environments where the instances provide functionally different roles, and thus do not, necessarily, share a disk. These parallel databases are said to use "function shipping".

In a parallel database environment where each node can see all of the database and control files, these files may be backed up from any of the nodes. Since there is a restriction that archived redo logs must be files in a file system, and there is a restriction at this time that file systems cannot be shared by multiple nodes of a cluster, each node's instance must maintain its own local thread of archived redo logs. (There is also a restriction that archive logs be available for write processing locally). In order to ensure that all necessary files can be backed up from a single node, the archive logs from all nodes must be made accessible for read access by the chosen backup node. This access can be via NFS or other acceptable methods for the host operating system. All database data files, control files, and archived redo logs may then be backed up from a single node of the cluster.

At restore time, all restore and recovery actions may also take place on a single node. All of the database data files and control files may be restored to their original locations. All nodes will have the required access to these files as before. All of the archived redo logs, however, may be restored to the archived redo log directory of the restore node's instance. Each log is named when created such that the database recovery command will recognize from which thread of redo it was created. This means that they do not need to be restored to their original location; only to a directory where they may be read by the recovering instance. In an illustrative embodiment of the present invention, however, it is desirable that the recovery node have NFS write ability to the other nodes. The archive logs are put back where they came from, to be more intuitive for the user. Users frequently must supply their own method for shutting down or starting up the database. This may be necessary for preparing applications for the database shutdown or startup. In order to facilitate this need, the user is supplied with "exits" during the backup preparation and release phases to specify that a script be executed in place of the standard data base shutdown and startup.

The default action when no script is specified by the user is to shutdown the database in a way that ensures that all database data has been fully written to disk and that all instance processes on all nodes have been terminated. These commands can be issued from a single node (dbshut). The default action for startup of the database is to perform a normal startup for instances on all nodes. This can be issued from a single node.

Advantages of the present invention include online or offline backup and restore mechanisms for a parallel server database, such as Oracle Parallel Server (OPS), which is effective for redo archive logs as well as database information. This allows for single node discovery, preparation, and release of a multiple node database.

Other advantages of the present invention include a system where files can be backed up from any node. In a parallel database environment where each node can see all of the database and control files, these files may be backed up from any of the nodes.

BRIEF DESCRIPTION OF THE DRAWINGS

The foregoing and other features and advantages of the present invention will be more fully understood from the following detailed description of illustrative embodiments, taken in conjunction with the accompanying drawings in which:

FIG. 10 is a flowchart of a database release phase from online backup as indicated in FIG. 5.

DETAILED DESCRIPTION

Figure 1:
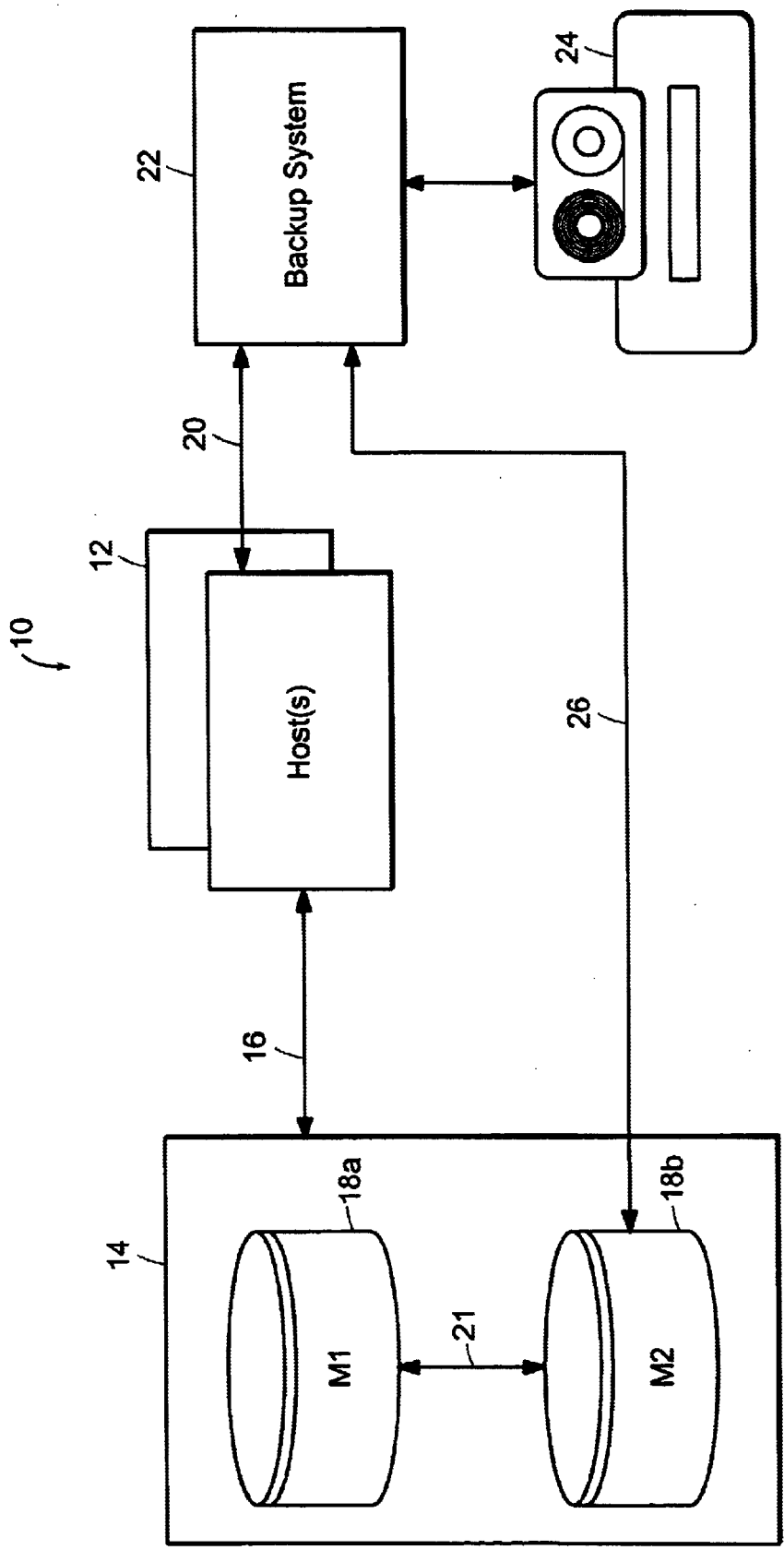
FIG. 1 is an overview of the major components of a backup system for a data storage system according to the prior art.
Figure 2:
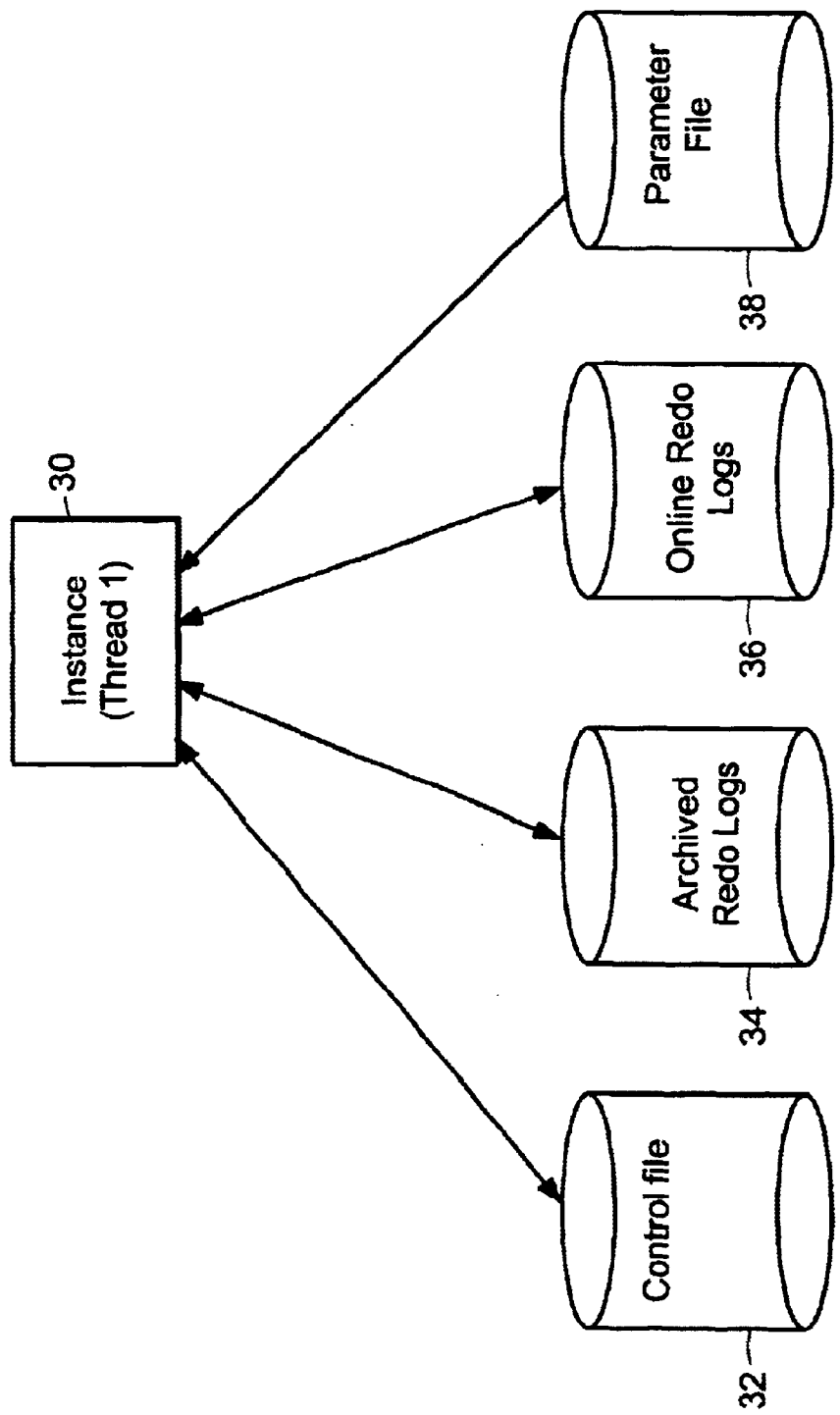
FIG. 2 is a block diagram of a backup single thread model for logs and control information system according to the prior art.

The present invention is directed towards a backup system 22 FIG. 1 to perform backup and restore of parallel server databases in a data storage system 14. A parallel server database configuration can be implemented on either an MPP (massively parallel processor) machine or in a hardware cluster of multiple distinct SMP (symmetric multiprocessor) machines. In the case of an MPP or "shared nothing" architecture, all nodes of the parallel server database configuration will exist on the same actual machine frame, but do not physically share disks. Disks are shared virtually via an interconnect within the frame. Each node may be an SMP machine. Multiple machines clustered together using proprietary hardware clustering can also comprise a parallel server database configuration. In this case a "node" is an independent machine.

Figure 3:
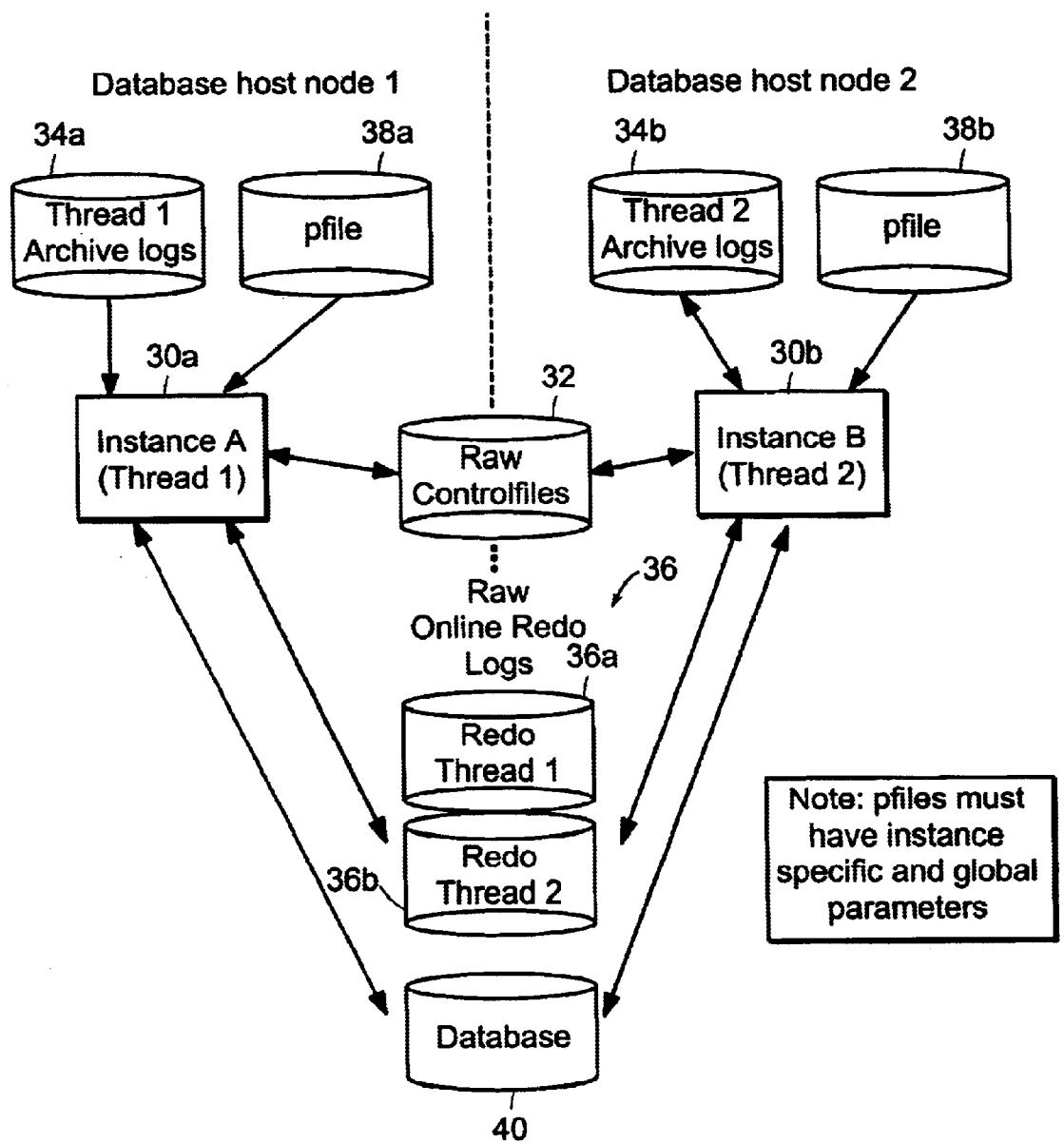
FIG. 3 is a block diagram showing a parallel server model for logs and control information according to the present invention.

A typical parallel server database architecture is illustrated in FIG. 3. One database 40 is serviced by several instances 30a, 30b. An instance is one or more process along with memory buffers servicing a database 40 on a particular node. By definition, a parallel server database has multiple instances 30. Each instance 30 is independently accessing the database 40. All data files 40 reside on raw partitions, and are visible to all parallel server database nodes. All online redo logs 36 similarly reside in raw partitions and are visible to all parallel server database nodes. All control files 32 have the same properties.

Figure 4:
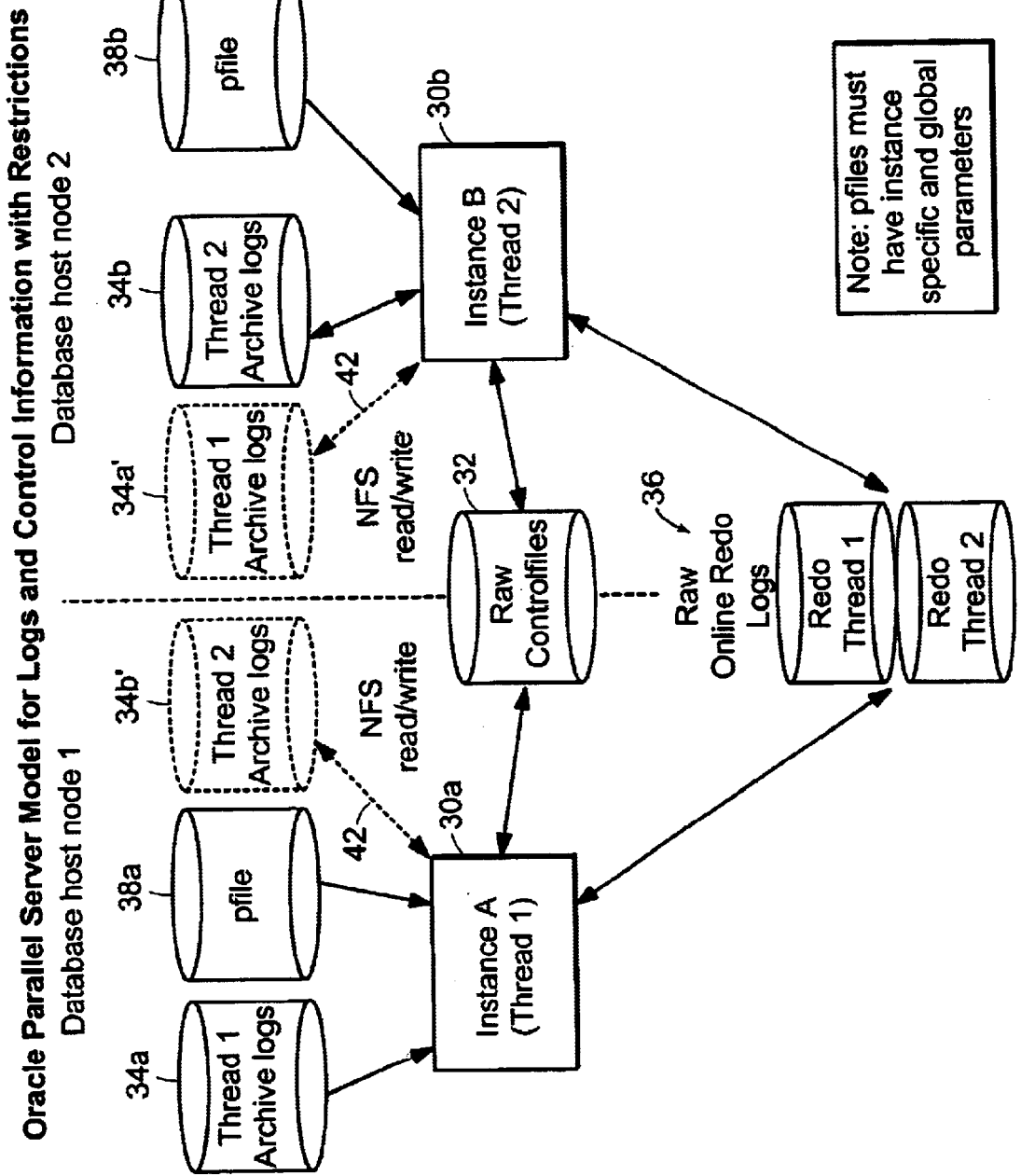
FIG. 4 is a block diagram showing a parallel server model for logs and control information with archive logs available across the nodes, according to the present invention.

Each instance 30a, 30b archives its own redo information 36a, 36b. Typically, the archive logs 34 are maintained in directories on the node where the instance 30 is running. Since archive logs 34 can be in several directories on different nodes, the present invention includes a method for backing up and restoring files from multiple machines (nodes). According to the present invention, the archive log 34 FIG. 4 directories are set to be readable and writable by all nodes servicing the database 40. The archive log directories from the different node are accessible 42 through the network file system (NFS) or equivalent, in read/write mode on any nodes from which backup or restore will be performed. Each of the directories 34a', 34b' is mounted using the exact same name everywhere it is mounted. The backup utility then is explicitly told the archive log 34 directories' names. There is no archive log 34 discovery on the part of the backup utility, except for validation of the directory names.

The backup utility according to the present invention is able to accept the names of multiple archive log 34 directories at configuration time. It then keeps these names in a ddtab (distributed database table) for this database 40. Backup scripts and configuration parameters are also updated to include these multiple directories. If no archive log 34 directories are specified, the default is to discover the archive log 34 directory in the usual method of discovery (using the archive log list command). However if an archive log 34 directory is specified, no discovery is done, and only the backup of the directories specified at configuration time is performed. The existence of the specified archived redo log directories will be validated at database discovery time. Since each of these archive log 34 directories is available from the chosen backup host, there is no requirement to know about the other nodes in the parallel server database configuration.

An example parallel server database is the Oracle Parallel Server (OPS) provided by Oracle Corporation. An illustrative embodiment of the present invention provides extensions to the EMC EDM backup system to allow backup/restore of nodes running Oracle Parallel Servers. It will be appreciated that the present invention will work for any of various parallel server databases running on any of various data storage systems.

Figure 5:
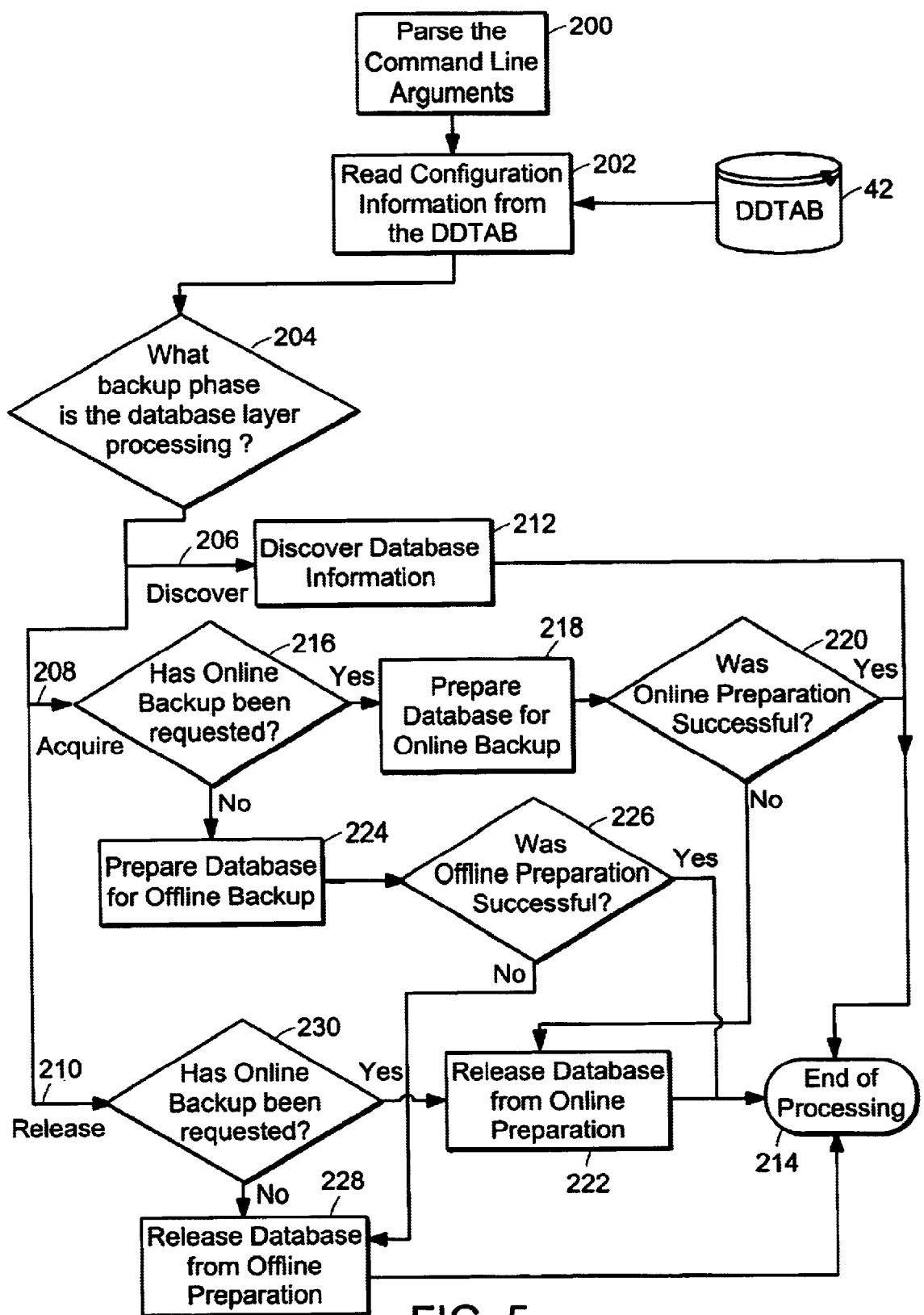
FIG. 5 is a flowchart of top level database backup processing according to an illustrative embodiment of the present invention.

The steps performed by the illustrative embodiment of the present invention are shown with reference to FIG. 5. A backup process running on the backup system commences with parsing any command line arguments provided, step 200. Next the system reads the configuration from the discovery data table (DDTAB) 42, step 202. The next step performed 204 depends on the particular backup phase, which includes Discover, Acquire, or Release. The particular backup phase is identified from the command line as parsed in step 200.

A Discovery phase 206 is used to determine what components of a database are to be backed up (for example, an archive log backup). The system then performs the discover database information step 212, which is described in reference to FIG. 6 below. Once the discover database information step 212 is complete, the processing is complete, step 214.

The Acquire stage 208 FIG. 5 is performed to prepare the system to allow the backup process to take place. The first step 216 is to determine if an online backup has been requested. If so, then the system prepares the database for online backup 218, which is described in reference to FIG. 9 below. The results of the online backup preparation are determined in step 220. If the online backup preparation was successful, the processing is complete, step 214. However if the online backup preparation was not successful, then the system attempts to return to database accessibility by releasing the database from online backup preparation, step 222, which is described in reference to FIG. 10. When that is complete, the processing is complete, step 214.

If at step 216 it is determined that an offline backup has been requested, the system prepares the database for offline backup 224, which is described in reference to FIG. 7 below. If the offline backup preparation was successful, the processing is complete, step 214. However if the offline backup preparation was not successful, then the system attempts to return to database accessibility by releasing the database from offline backup preparation, step 228, which is described in reference to FIG. 8. When that is complete, the processing is complete, step 214.

When the system backup is complete, the Release stage 210 FIG. 5 is performed. The first step 230 is to determine if an online backup was requested (and presumably performed, although the Release stage is performed even if the backup did not take place). If so, then the system releases the database from online backup preparation, step 222, again which is described in reference to FIG. 10, and the processing is complete, step 214. If an offline backup was requested, then the system releases the database from offline backup preparation, step 228, again which is described in reference to FIG. 8. When that is complete, the processing is complete, step 214.

Figure 6:
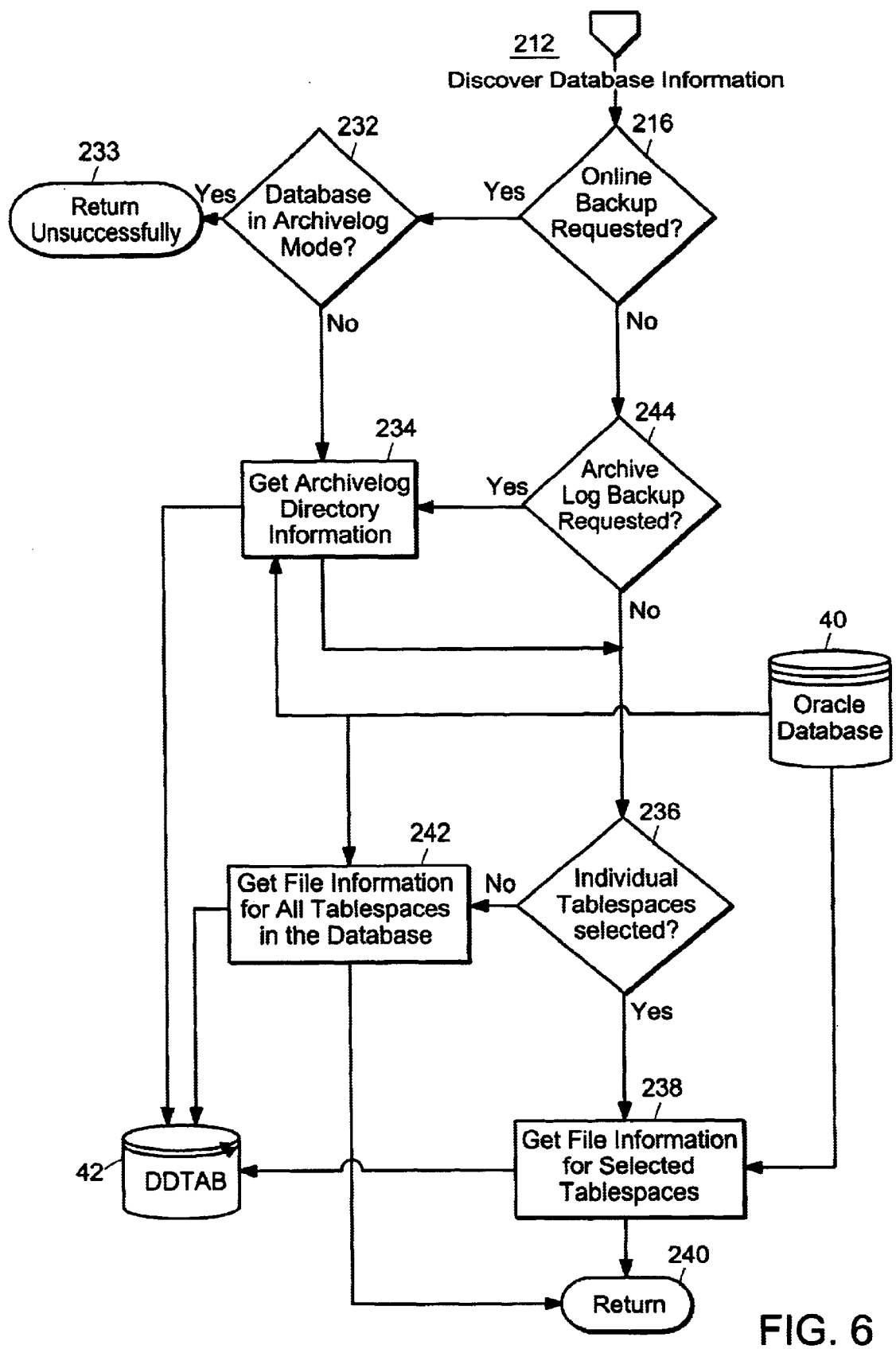
FIG. 6 is a flowchart of a discover phase of database backup processing as indicated in FIG. 5.

FIG. 6 illustrates the steps performed during a discover database information stage 212 of FIG. 5. If an online backup was requested, step 216 FIG. 6, the system checks to see the database is in Archive Log mode, step 232. If it is, the system returns unsuccessfully, step 233. Otherwise, the system gets archive log directory information from the database 40 and stores it in the ddtab 42, step 234. Next, the system checks whether individual tablespaces have been selected, step 236. If so, the system gets the file information for the selected tablespaces from the database 40 and store it in the ddtab 42, step 238. The system then returns, step 240.

If at step 236 it is determined that all tablespaces have been selected, the system then gets file information for all tablespaces in the database 40 and stores it in the ddtab 42, step 242. The system then returns, step 240.

If at step 216 it is determined that an online backup was not requested, the system next determines if an archive log backup was requested, step 244. If so, the system then proceeds with the step 234 of getting the archive log directory information. If not, then the system proceeds with the step 236 of determining whether specific tablespaces have been selected.

Figure 7:
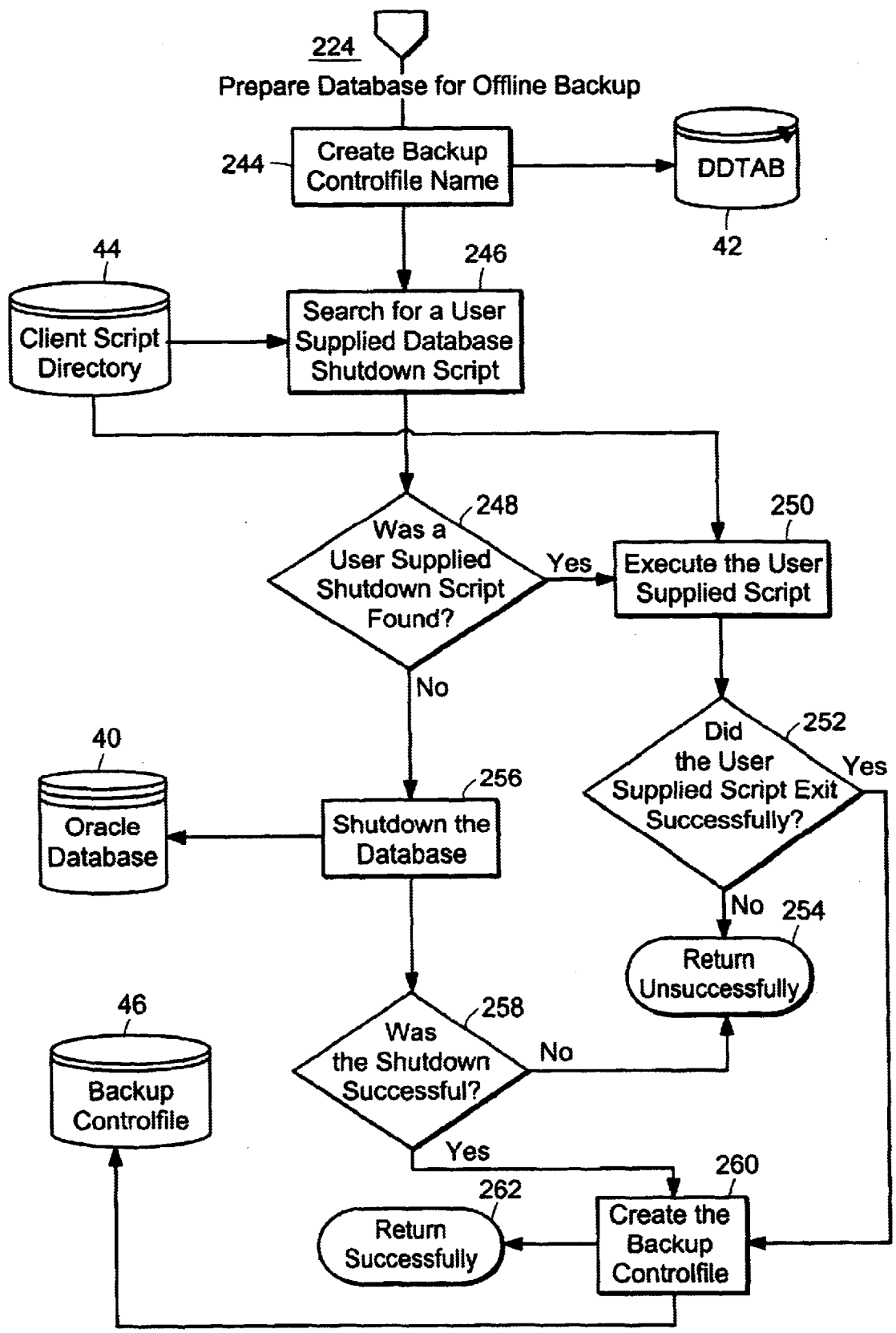
FIG. 7 is a flowchart of a database preparation phase for offline backup as indicated in FIG. 5.

FIG. 7 illustrates the steps performed to prepare the database 40 for offline backup, step 224 of FIG. 5. The system first creates a backup controlfile name which is stored in the ddtab 42, step 244 FIG. 7. This controlfile name is used in 260 as the name to create the backup controlfile. The system then searches the appropriate script directory for a user supplied database shutdown script, step 246. If a user supplied shutdown script is found, step 248, it is executed, step 250. If the user supplied shutdown script exits successfully, step 252, the system creates the backup controlfile 46, step 260, and returns successfully, step 262. If the user supplied shutdown script does not exit successfully at step 252, then the system returns unsuccessfully, step 254.

If a user supplied shutdown script was not found at step 248, then the system proceeds with the default shutdown, and shuts down the database 40, step 256. If the database 40 shutdown was not successful, step 258, then the system returns unsuccessfully, step 254. If the database 40 shutdown was successful at step 225, then system creates the backup controlfile 46, step 260, and returns successfully, step 262.

Figure 8:
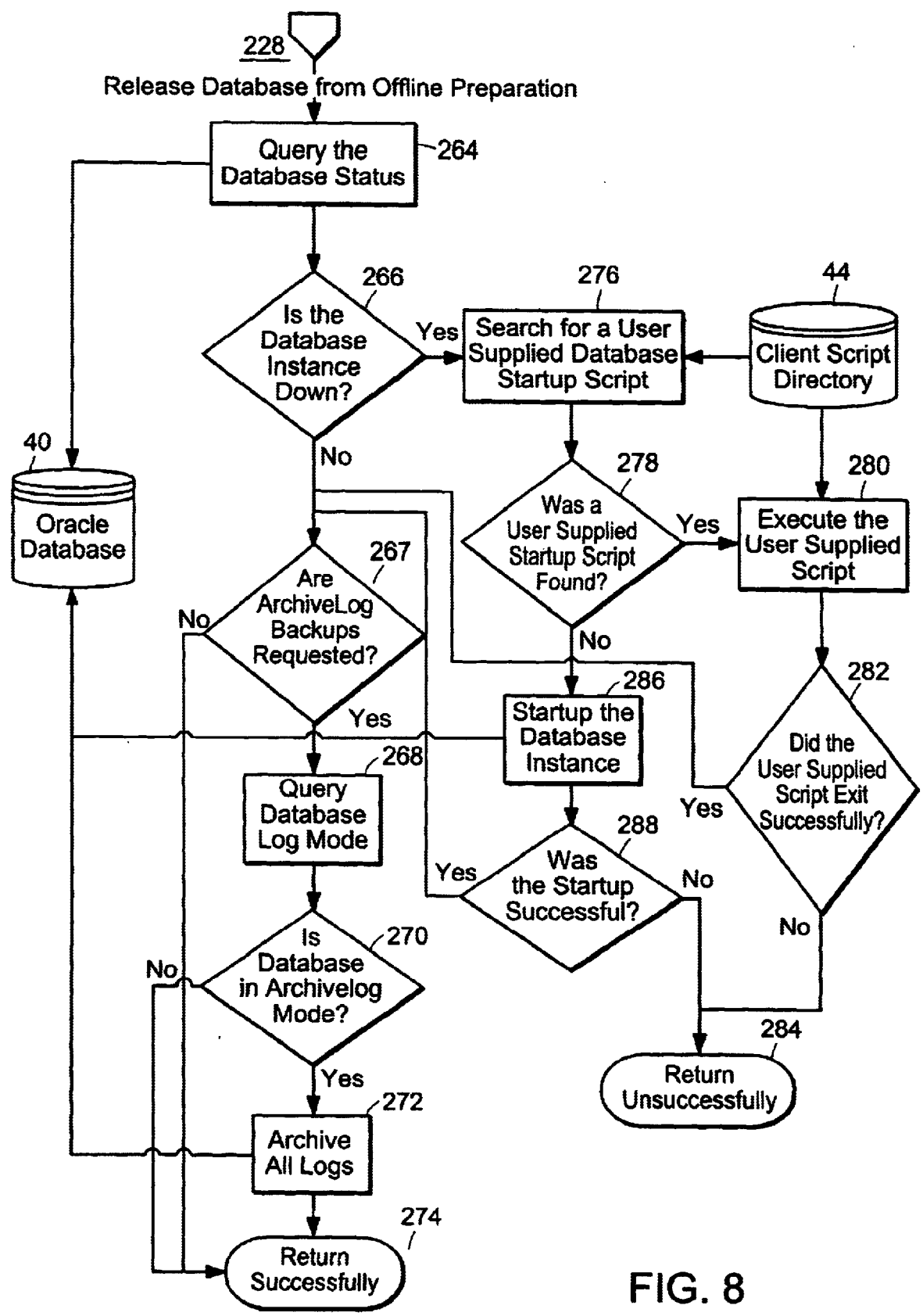
FIG. 8 is a flowchart of a database release phase from offline backup as indicated in FIG. 5

FIG. 8 illustrates the steps performed to release the database 40 from offline backup, step 228 of FIG. 5. The system first queries the status of the database 40, step 264 FIG. 8. The system then checks to see if the database instance 30 is down, step 266. If so, the system then searches the client script directory 44 for a user supplied database startup script, step 276. If a user supplied startup script is found, step 278, it is executed, step 280. If the user supplied startup script does not exit successfully, step 282, the system returns unsuccessfully, step 284. If the user supplied script exits successfully at step 282, then the system proceeds with step 267 by checking if archivelog backups are requested. If not, then the system returns successfully, step 274. If archivelog backups are requested, then the system queries the database log mode, step 268. If the database is not in archivelog mode, step 270, then the system returns successfully, step 274. If the database is in archivelog mode, then the system archives all the logs to the database 40, step 272, and returns successfully, step 274.

If at step 278 a user supplied startup script was not found, then the system starts up the database instance 30, step 286. If the startup was not successful, step 288, then the system returns unsuccessfully, step 284. However if the start up was successful, then the system proceeds with step 267 and subsequent steps.

If at step 266 the database instance was not down, then the system proceeds with step 267 of checking for archivelog backups requests, and subsequent steps.

Figure 9:
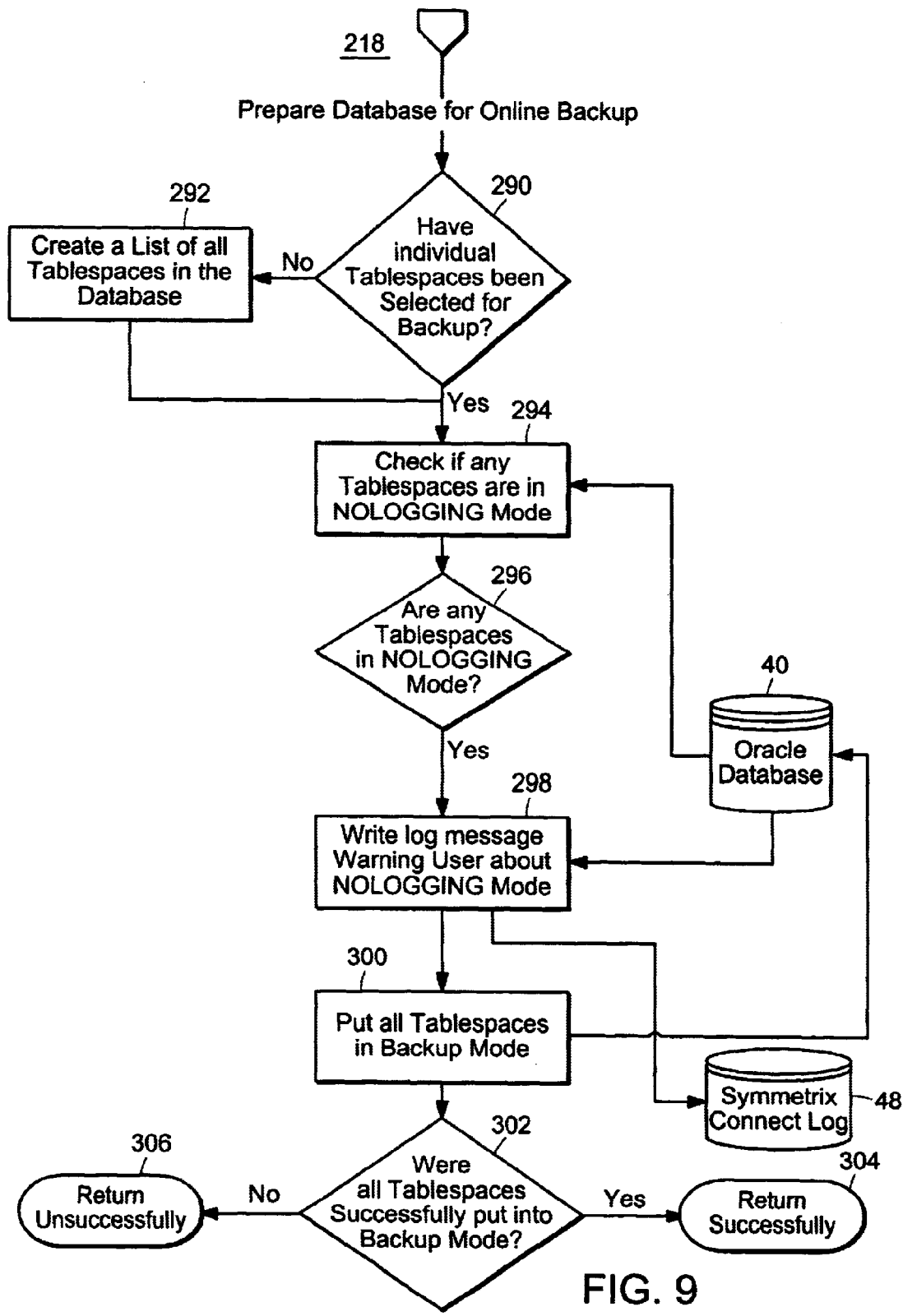
FIG. 9 is a flowchart of a database preparation phase for online backup as indicated in FIG. 5.

FIG. 9 illustrates the steps performed to prepare the database 40 for online backup, step 218 of FIG. 5. The system first checks to see if individual tablespaces have been selected for the backup, step 290 FIG. 9. If not, then a list of all tablespaces in the database is created and used instead, step 292. The system then checks the database 40 to see if any tablespaces are in "NOLOGGING" mode, step 294. NOLOGGING indicates that an intent to not log certain updates has been made. Online backup may not be the correct backup choice since at recovery time the redo logs are used to ensure consistency. If any of the tablespaces are in NOLOGGING mode, step 296, then the system writes out a log message to the user with a warning about the NOLOGGING mode, step 298. This log message is also stored in the connect log database 48. The system then puts all tablespaces into backup mode, step 300, and checks to make sure all tablespaces were successfully put into backup mode, step 302. If all tablespaces were successfully put into backup mode, the system returns successfully, step 304. If not, the system returns unsuccessfully, step 302.

FIG. 10 illustrates the steps performed to release the database 40 from online backup, step 222 of FIG. 5. The system first checks to see if individual tablespaces have been selected for the backup, step 308 FIG. 10. If not, then a list of all tablespaces in the database is created and used instead, step 310. Next, the system directs the database 40 to take all tablespaces out of backup mode, step 312. The system then checks to make sure all tablespaces were successfully taken out of backup mode, step 314. If all tablespaces were not successfully taken out of backup mode, the system returns unsuccessfully, step 324. If all tablespaces were successfully taken out of backup mode, the system creates a backup control file 46, step 316. If the backup control file was not successfully created, step 318, the system returns unsuccessfully, step 324. Otherwise the system then archives all logs to the database 40, step 320. The system then checks whether the logs were successfully archived, and returns successfully 326 or unsuccessfully depending on the check 322.

Offline database backup requires that each of the instances participating in the parallel server database cluster be shutdown. The illustrative embodiment takes no default actions for offline database acquire, which is different from single instance database backup. With single instance backups, the illustrative embodiment looks for a user shutdown script. If it does not exist the default action is taken of shutting the database down with the immediate option, starting it up again with the mount option, and then shutting it down normal. If the data indicates that this is a parallel server database backup, the illustrative embodiment requires the existence of a user shutdown script and aborts the backup if it cannot be executed. For offline release, the user is warned if no executable post backup startup script exists.

Logs are not required for a full external restore, since a full external restore is consistent. Logs are required, however, for a partial external restore. It is required that the physically restored data be logically restored to make the server consistent. The user uses the standard vendor-specific DBMS backup utility functionality to ensure that logs are backed up. Typically, automatic backup log alarm archiving (to tape) is turned on. It is possible that any attempts by Symmetrix connect to affect the logs would interfere with this.

Although the invention has been shown and described with respect to illustrative embodiments thereof, various other changes, omissions and additions in the form and detail thereof may be made therein without departing from the spirit and scope of the invention.

What is claimed is:

1. In a computer system including a plurality of nodes accessing common data in a data storage system, a method of backing up said common data from any one of said nodes, comprising:

configuring each of said plurality of nodes to maintain an archived redo log in a local file for that node;

selecting a node for performing a backup operation;

setting said archived redo logs in local files on each of said nodes to be read and write accessible to at least said selected backup node;

informing said selected backup node of the names of said archived redo logs; and on said selected backup node, running a backup utility which backs up said common data and said archived redo logs for said computer system.

2. The method of claim 1 further including setting said archived redo logs in local files on each of said nodes to be read and write accessible across all of said nodes.

3. The method of claim 2 wherein said archived redo logs in local files on each of said nodes are set to be read and write accessible through mounting with a network file system (NFS), using the same name each of said nodes.

4. The method of claim 1 wherein said archived redo logs are created with names which allows a backup or recover utility to identify which node an archived redo log belongs.

5. The method of claim 1 further including:

before said step of running a backup utility which backs up said common data and said archived redo logs for said computer system, shutting down access to said common data.

6. The method of claim 5 wherein said backup utility allows for user-supplied scripts for shutting down access to said common data.

7. In a computer system having a plurality of nodes, wherein each of said plurality of nodes includes an archived redo log disposed in a local file, a data backup/restore method comprising:

configuring the archived redo log in each of the plurality of nodes to be read/write accessible across all of the plurality of nodes;

obtaining data from a shared database, said shared database being accessible across all of the plurality of nodes;

identifying a backup phase to be performed on said data, wherein said backup phase includes at least one of a discovery phase, an acquire phase and a release phase; and performing said backup phase on said data, such that said data is stored within a distributed database table.

8. The method of claim 7, wherein said discovery phase includes obtaining archive log directory information from the archived redo log in each of the plurality of nodes and storing said archive log directory information in said distributed database table.

9. The method of claim 8, wherein said discovery phase further includes obtaining file information for individually selected tablespaces in said database and storing said file information in said distributed database table.

10. The method of claim 8, wherein said discovery phase further includes obtaining file information for all tablespaces in said database and storing said file information in said distributed database table.

11. The method of claim 7, wherein said discovery phase includes determining if an archive log backup was requested.

12. The method of claim 7, wherein said acquire phase includes configuring database tablespaces into a backup mode.

13. The method of claim 7, wherein said release phase includes determining if database tablespaces have been configured into a backup mode, instructing said database to remove said database tablespaces from said backup mode and confirming that said database tablespaces are out of said backup mode.

14. The method of claim 7, wherein said release phase includes generating a backup control file, archiving each of the archived redo log files to said database and confirming that each of the archived redo log files were successfully archived.

15. In a computer system having a plurality of nodes, each node having access to a shared database and also having local storage, wherein at least one of said plurality of nodes includes a redo log in local storage for said node, said redo log including information regarding data in said shared database, a method of performing a backup operation of said shared database comprising:

selecting one of said plurality of nodes to perform said backup operation;

obtaining information regarding a directory location of said local redo log for said at least one node;

setting said local redo log to be read/write accessible by said selected backup node;

using said selected backup node to access data in said shared database and also in said local redo log to perform said backup operation, wherein said read/write access is removed at the end of said backup operation.

16. The method of claim 15, wherein said selected backup node causes said data in said local redo log to be used to update said shared database before performing said backup operation.

17. The method of claim 15, wherein said local redo log for said at least one node is not accessible by said node while said selected backup node is accessing said local redo log.

18. The method of claim 15, wherein said local redo log is set to be read/write accessible to all of said nodes in said computer system.

* * * * *